(12) United States Patent
Kuan

(10) Patent No.: US 11,839,331 B1
(45) Date of Patent: Dec. 12, 2023

(54) WARMING CABINET FOR FOOD STORAGE

(71) Applicant: Everidge, Inc., Plymouth, MN (US)

(72) Inventor: Danny Chien-Yung Kuan, Hong Kong (CN)

(73) Assignee: Everidge, Inc., Plymouth, MN (US)

( * ) Notice: Subject to any disclaimer, the term of this patent is extended or adjusted under 35 U.S.C. 154(b) by 567 days.

(21) Appl. No.: 16/787,504

(22) Filed: Feb. 11, 2020

(51) Int. Cl.
*A47J 39/02* (2006.01)
*A47J 36/24* (2006.01)

(52) U.S. Cl.
CPC .......... *A47J 39/02* (2013.01); *A47J 36/2483* (2013.01)

(58) Field of Classification Search
CPC ........ A47J 39/00; A47J 39/003; A47J 39/006; A47J 39/02; A47J 36/2483
See application file for complete search history.

(56) References Cited

U.S. PATENT DOCUMENTS

| | | | | |
|---|---|---|---|---|
| 4,323,110 A | * | 4/1982 | Rubbright | A47J 39/006 219/400 |
| 5,285,051 A | * | 2/1994 | DeGrow | A23L 3/365 219/386 |
| 6,392,201 B1 | * | 5/2002 | Owens | A47J 47/145 219/387 |
| 2004/0020915 A1 | * | 2/2004 | Shei | A47J 39/006 219/400 |
| 2011/0198339 A1 | * | 8/2011 | Hansen | A47J 39/006 29/592.1 |
| 2014/0227402 A1 | * | 8/2014 | Tan | A47J 39/006 99/483 |
| 2018/0163971 A1 | * | 6/2018 | Mizusaki | F24C 7/067 |

* cited by examiner

*Primary Examiner* — Erin McGrath

(57) ABSTRACT

The present disclosure relates generally to apparatuses, systems, and methods for food storage and warming, and particularly, providing static, constant, even, and gentle heat for precise temperature and humidity control.

3 Claims, 8 Drawing Sheets

WARMING CABINET FOR FOOD STORAGE

FIELD

The present disclosure relates generally to apparatuses, systems, and methods for food storage and warming.

BACKGROUND

Warming cabinets for food storage and transport are commonly utilized in the catering and restaurant industries. Warming cabinets may be used to maintain already-prepared food in a ready-to-serve state. Warming cabinets may also be used for the secure transport of food, and so contain shelves or trays within the cabinet. Optimally, these cabinets maintain a desired temperature and humidity in view of the opening and closing of doors and/or movement of the cabinet.

Traditional warming cabinets use high-density heating elements like thermal cables or coils, which lack precise temperature control and require a fan to move the high-density heat throughout the cabinet. High-density heating elements are generally located on only one side of the cabinet yielding internal 'hot spots' and a temperature variance of up to 25° C., leading to unpredictability and altered food texture. The use of a fan to distribute the high-density heat further leads to faster drying of the food, so these cabinets use water or water vapor to compensate for the loss of humidity, resulting in foods that taste washed out or dried upon serving. The use of high-density heat elements also creates dangerously-hot exterior cabinet walls. The high-density heating elements are prone to short-circuiting and are burdensome to repair or replace, requiring a disassembly of the entire cabinet.

SUMMARY

A warming cabinet or banquet cart is disclosed having thermal pads positioned on multiple interior faces of the cart such that the thermal pads provide a radiant, static, constant, even, and gentle heat. This heat maintains a precise temperature and humidity in the warming cabinet chamber without the use of fans or water vapor, which alter food taste and texture. The thermal pads can be independently controlled for optimal temperature control and consume less energy than conventional high-density heating elements, which demand high wattage to kick start a heating cycle and process. The joints of these heating elements may be located away from potential water sources, decreasing their propensity for short-circuiting, but when needed, the thermal pads are easy to service and can be repaired replaced individually.

According to one example ("Example 1"), a warming cabinet apparatus includes a housing interior including an upper surface, a lower surface, a first sidewall arranged between the upper surface and the lower surface, and a second side wall arranged between the upper surface and the lower surface; and a first heating element arranged on the first sidewall and a second heating element arranged on the second side wall, the first heating element and the second heating element being independently or jointly controllable and configured to radiate heat throughout the housing interior.

According to another example ("Example 2"), further to the apparatus of Example 1, the first heating element and the second heating element are configured to maintain moisture within the housing interior.

According to another example ("Example 3"), further to the apparatus of Example 2, the first heating element and the second heating element are configured to maintain a maximum amount of natural food product moisture.

According to another example ("Example 4"), further to the apparatus of Example 1, the first heating element and the second heating element are configured to radiate heat to maintain a temperature within the housing interior of between about 4° C. to about 6° C.

According to another example ("Example 5"), further to the apparatus of Example 1, the first sidewall and the second sidewall include polyurethane insulation, and the first sidewall and the second sidewall are configured to thermally insulate the housing interior from an exterior surface of the first sidewall and the second sidewall.

According to another example ("Example 6"), further to the apparatus of Example 1, the first heating element and the second element are configured to radiate heat independently.

According to another example ("Example 7"), further to the apparatus of Example 1, the heating elements are accessible from the housing interior.

According to another example ("Example 8"), further to the apparatus of Example 1, the first heating element and the second heating element are configured to maintain a temperature within the housing interior without use of a fan or high-density heating element.

According to another example ("Example 9"), further to the apparatus of Example 1, the first sidewall includes an upper portion and a lower portion, and the second sidewall includes an upper portion and a lower portion and further includes one or more heating elements arranged on the upper portion of the first sidewall and one or more heating elements arranged on the lower portion of the first sidewall and one or more heating elements arranged on the upper portion of the second sidewall and one or more heating elements arranged on the lower portion of the second sidewall, the one or more heating elements independently or jointly controllable and configured to radiate heat throughout the housing interior.

According to another example ("Example 10"), a warming cabinet apparatus includes a housing interior including an upper surface, a lower surface, a first sidewall arranged between the upper surface and the lower surface, and a second side wall arranged between the upper surface and the lower surface; and one or more heating elements arranged on the first sidewall or on the second side wall, the one or more heating element being independently or jointly controllable and configured to radiate heat and maintain moisture throughout the housing interior.

According to another example ("Example 11"), further to the apparatus of Example 10, the one or more heating elements are configured to radiate heat to maintain a temperature within the housing interior of between about 4° C. to about 6° C.

According to another example ("Example 12"), further to the apparatus of Example 10, the first sidewall and the second sidewall include polyurethane insulation, and the first sidewall and the second sidewall are configured to thermally insulate the housing interior from an exterior surface of the first sidewall and the second sidewall.

According to another example ("Example 13"), further to the apparatus of Example 10, the one or more heating elements are configured to radiate heat independently.

According to another example ("Example 14"), further to the apparatus of Example 10, the one or more heating elements are accessible from the housing interior.

According to another example ("Example 15"), further to the apparatus of Example 10, the one or more heating elements are pads substantially rectangular in shape, square in shape, circular in shape, oval in shape, hexagonal in shape, or octagonal in shape.

According to another example ("Example 16"), further to the apparatus of Example 10, the first sidewall includes an upper portion and a lower portion, and the second sidewall includes an upper portion and a lower portion and further includes one or more heating elements arranged on the upper portion of the first sidewall and one or more heating elements arranged on the lower portion of the first sidewall and one or more heating elements arranged on the upper portion of the second sidewall and one or more heating elements arranged on the lower portion of the second sidewall, the one or more heating elements independently or jointly controllable and configured to radiate heat throughout the housing interior.

According to another example ("Example 17), a method of operating a warming cabinet apparatus includes arranging food within a housing interior, the housing interior including an upper surface, a lower surface, a first sidewall arranged between the upper surface and the lower surface, and a second side wall arranged between the upper surface and the lower surface; and maintaining a temperature and humidity within the housing interior using one or more heating elements arranged on the first sidewall or on the second side wall, the one or more heating element being independently or jointly controllable and configured to radiate heat throughout the housing interior.

According to another example ("Example 18"), further to the method of Example 17, the one or more heating elements are configured to radiate heat to maintain a temperature within the housing interior of between about 4° C. to about 6° C.

According to another example ("Example 19"), further to the method of Example 17, the one or more heating elements are configured to maintain moisture within the housing interior.

According to another example ("Example 20"), further to the method of Example 17, the one or more heating elements are configured to maintain a maximum amount of natural food product moisture.

The foregoing Examples are just that, and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

DETAILED DESCRIPTION

Definitions and Terminology

Figure 1:
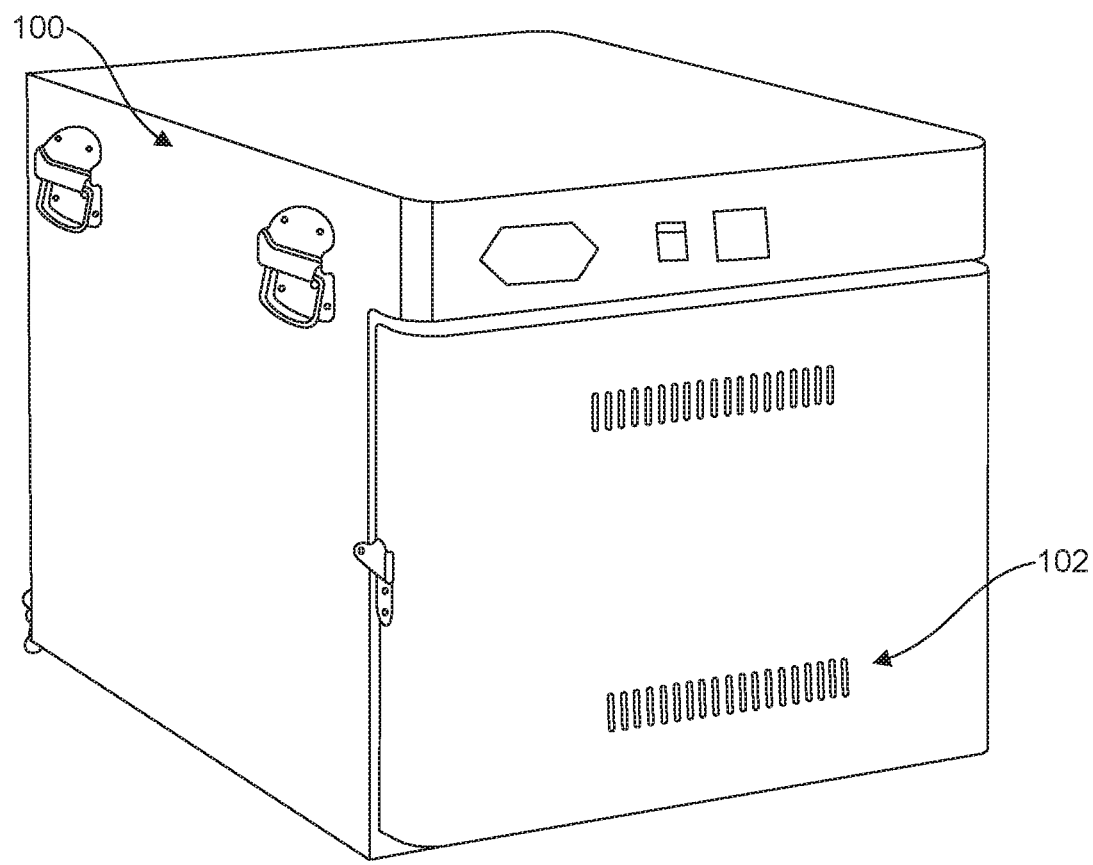
FIG. 1 is an illustration of an exterior of an example warming cabinet, in accordance with various aspects of the present disclosure.

This disclosure is not meant to be read in a restrictive manner. For example, the terminology used in the application should be read broadly in the context of the meaning those in the field would attribute such terminology.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms "about" and "approximately" can be understood to mean plus or minus 10% of the stated value.

Throughout this disclosure, the term "warming cabinet" is used to describe what may otherwise or additionally be called a "banquet cabinet", a "cabinet", a "banquet cart", and/or a "holding cabinet."

DESCRIPTION OF VARIOUS EMBODIMENTS

Persons skilled in the art will readily appreciate that various aspects of the present disclosure can be realized by any number of methods and apparatuses configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

FIG. 1 is an illustration of an exterior of an example warming cabinet 100, in accordance with various aspects of the present disclosure. The warming cabinet has a door 102 which may open and close to allow for the placement of food within the warming cabinet 100. The warming cabinet 100 may be used to keep food at a safe and even temperature. The warming cabinet 100 may be of any size or shape such that food may be placed inside the warming cabinet 100 for storage and/or transportation.

As described in further detail below, the warming cabinet 100 includes one or more heating elements configured to radiate heat. The heat provide may be static, constant, even, and gentle throughout an interior of the warming cabinet 100. In addition, and as described in further detail below, due to the static, constant, even, and gentle heat, the one or more heating elements maintain a moisture content level within the interior of the warming cabinet 100. In this manner, for example, food arranged within the interior of the warming cabinet 100 may be maintained at a desired moisture level and will not dry out prior to service.

Figure 2:
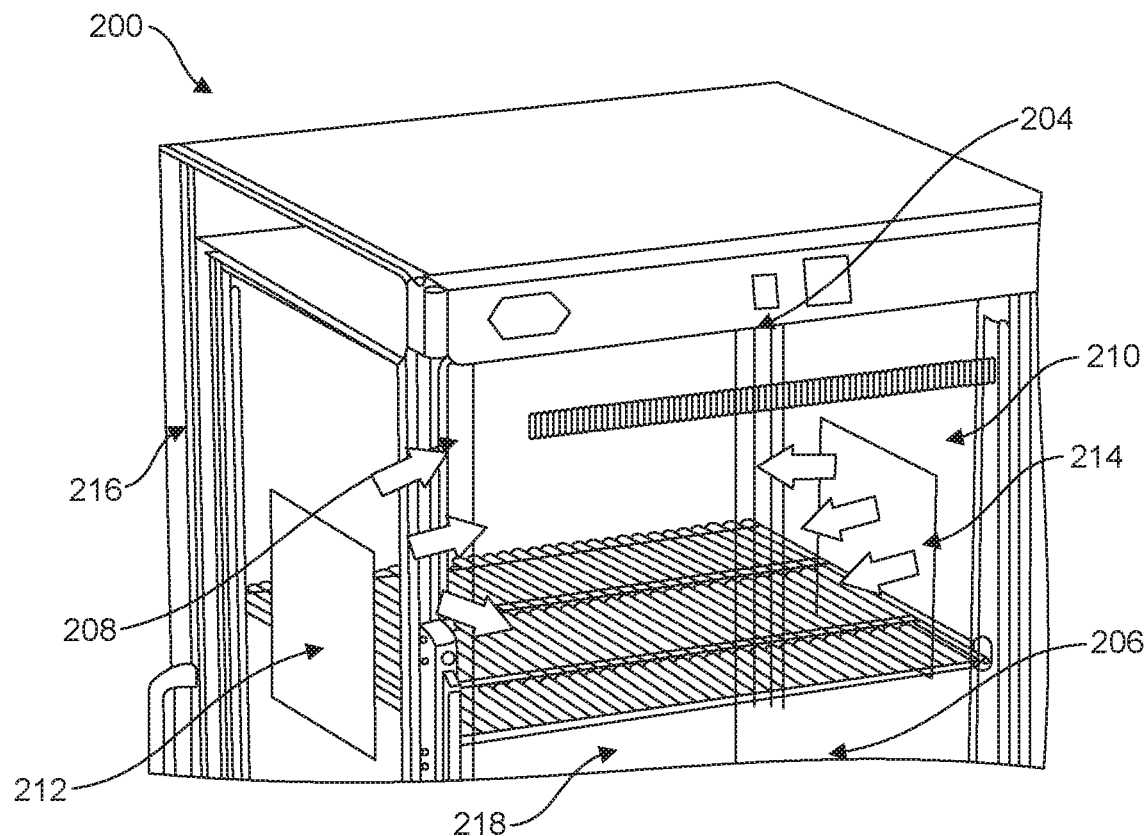
FIG. 2 is a partial cut-away illustration of an interior of an example warming cabinet, in accordance with various aspects of the present disclosure.

FIG. 2 is a partial cutaway illustration of an interior of an example warming cabinet, in accordance with various aspects of the present disclosure. The warming cabinet 200 has an upper surface 204 connected to a lower surface 206 via a first sidewall 208 and a second sidewall 210. In some examples, a first heating element 212 is attached to a first sidewall 208 between an upper surface 204 and a lower surface 206. In some examples, a second heating element 214 is attached to a second sidewall 210 between an upper surface 204 and a lower surface 206. The first and second heating elements 212, 214 are configured to radiate heat throughout the housing interior 218. Using such a configuration results in the heat being evenly distributed throughout the housing interior 218 to minimize hot spots in any portion of the warming cabinet 200.

In some examples, the heating elements 212, 214 (e.g., thermal pads) radiate heat toward or in the generally direction of the housing interior 218 instead of toward the upper surface 204, lower surface 206, first sidewall 208, or second sidewall 210, such that the warming cabinet 200 requires less energy to maintain a steady temperature than traditional warming cabinets. The heating elements 212, 214 radiate heat such that the warming cabinet 200 does not use a fan and a high-density heating element to maintain a desired temperature in the interior of the warming cabinet 200. The heating elements 212, 214 radiating heat in this manner may result in food inside the housing interior 218 remaining at a desired and even temperature while retaining a maximum amount of natural food-product moisture.

The heating elements 212, 214 provide a radiant, static, constant, even, and gentle heat throughout the entire cabinet. As compared with traditional high-density heating elements like thermal cables or coils, the heating elements 212, 214 may precisely maintain the heat of food while using 1/3-1/2 of the energy of high-density heating equipment. The heating elements 212, 214 may be easily and accurately thermostatically controllable, within one (1) degree Celsius. Such control results in limited temperature fluctuations and a narrow, targeted, temperature range.

The resulting smaller temperature fluctuation range requires less energy to start and maintain a heating cycle, and therefore consumes much less overall energy, particularly as compared with traditional high-density heating elements, which have a temperature fluctuation of 10-20° C. and require a larger amount of energy to start and maintain a heating cycle. The broader the temperature fluctuation, the more energy the unit requires to maintain a temperature.

Figure 3A:
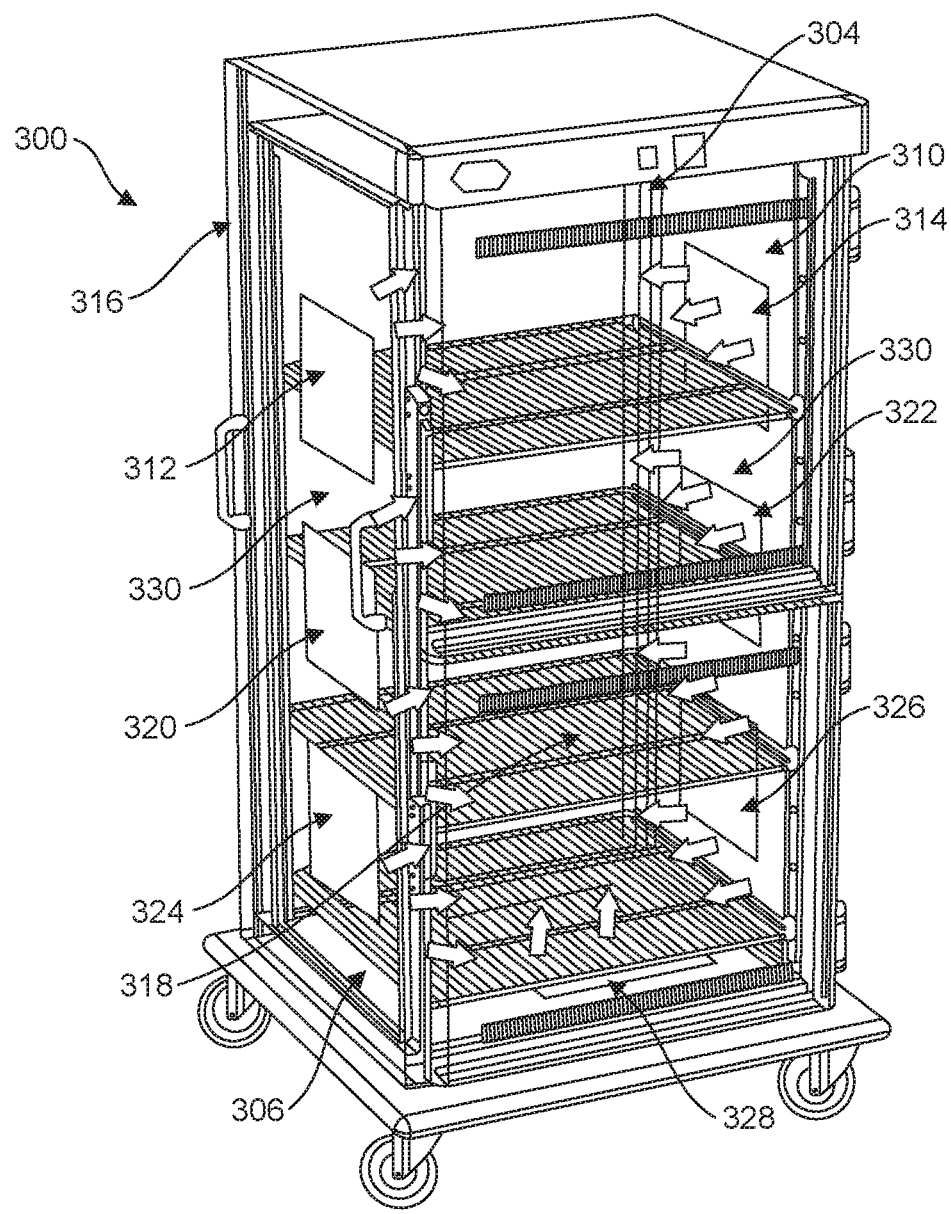
FIG. 3A is a partial cut-away illustration of an interior of an example warming cabinet, in accordance with various aspects of the present disclosure.

FIG. 3A is a partial cutaway illustration of an interior of another example warming cabinet, in accordance with various aspects of the present disclosure. The warming cabinet 300 has an upper surface 304, a lower surface 306 and a first sidewall 308 and a second sidewall 310 extending between the upper surface 304 and the lower surface 306. In some examples, a first heating element 312 is attached to a first sidewall 308 between an upper surface 304 and a lower surface 306. In some examples, one or more heating elements 312, 314 are embedded into sidewalls 308, 310. In some examples, a second heating element 314 is attached to a second sidewall 310 between an upper surface 304 and a lower surface 306. In some examples, the warming cabinet 300 has a third heating element 320, a fourth heating element 322, a fifth heating element 324, a sixth heating element 326, and a seventh heating element 328 (fewer or greater numbers of heating elements may be utilized as required by for maintaining temperature and interior volume of the warming cabinet 300). In some examples, like the first and second heating elements 312, 314, the third, fourth, fifth, and sixth heating elements 320, 322, 324, 326 are attached to a sidewall. In such examples, there may also be a seventh heating element 328 attached to the lower surface 306. In some aspects, the heating elements are evenly spaced across the sidewalls.

The multiple heating elements depicted in the warming cabinet 300 may provide radiant heat from more than one direction, to allow for efficient and reliable temperature control within the housing interior 318. Further, the position of the multiple heating elements with integrated gaps (as shown in FIG. 4B) located on the first sidewall 308 and second sidewall 310 ensure optimal maintaining of heat and even temperature within the housing interior 318. The multiple heating elements can be independently controlled or controlled as a unit, to allow for desired temperature control within the housing interior 318. In certain instances, heating elements 312, 314, 320, 322, 324, 326, 328 may require different amounts of heat to maintain the desired temperature. Circulating power to the heating elements 312, 314, 320, 322, 324, 326, 328 may save energy and resources.

In some examples the use of a thermostat or thermocouple coupled with the multiple heating elements allows for precise temperature control so that food products can be held at a desired or set serving temperature for an extended period of time without unnecessary temperature fluctuations drying out the food products.

Figure 3B:
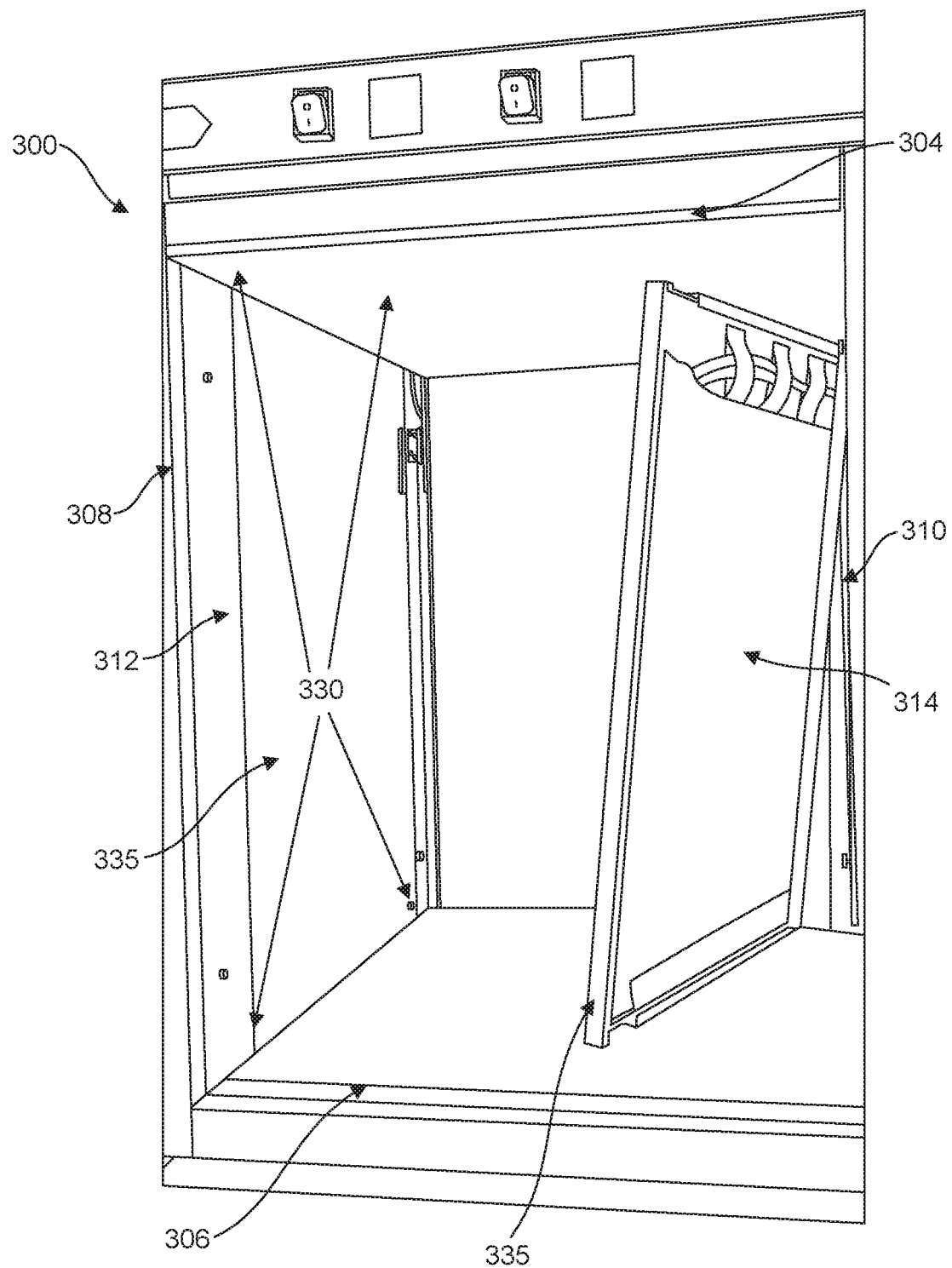
FIG. 3B is an illustration of the interior of a portion of the warming cabinet, shown in FIG. 3A, in accordance with various aspects of the present disclosure.

FIG. 3B is an illustration of an interior of another example warming cabinet, in accordance with various aspects of the present disclosure. The warming cabinet 300 has an upper surface 304, a lower surface 306 and a first sidewall 308 and a second sidewall 310 extending between the upper surface 304 and the lower surface 306. In some aspects, the sidewalls 308, 310 are foamed PU insulation. In some examples, a first heating element 312 is attached to a first sidewall 308 between an upper surface 304 and a lower surface 306. In some examples, one or more heating elements 312, 314 are attached to an inner removable sidewall cover 335. In some aspects, the inner removable sidewall cover 335 is attached to sidewalls 308, 310 with one or more removeable elements, such as screws 330, in some cases four screws 330, and the inner rem oveable sidewall cover 335 and heating elements 312, 314 can be removed from the sidewalls 308, 310 by unscrewing the screws 330.

Figure 4A:
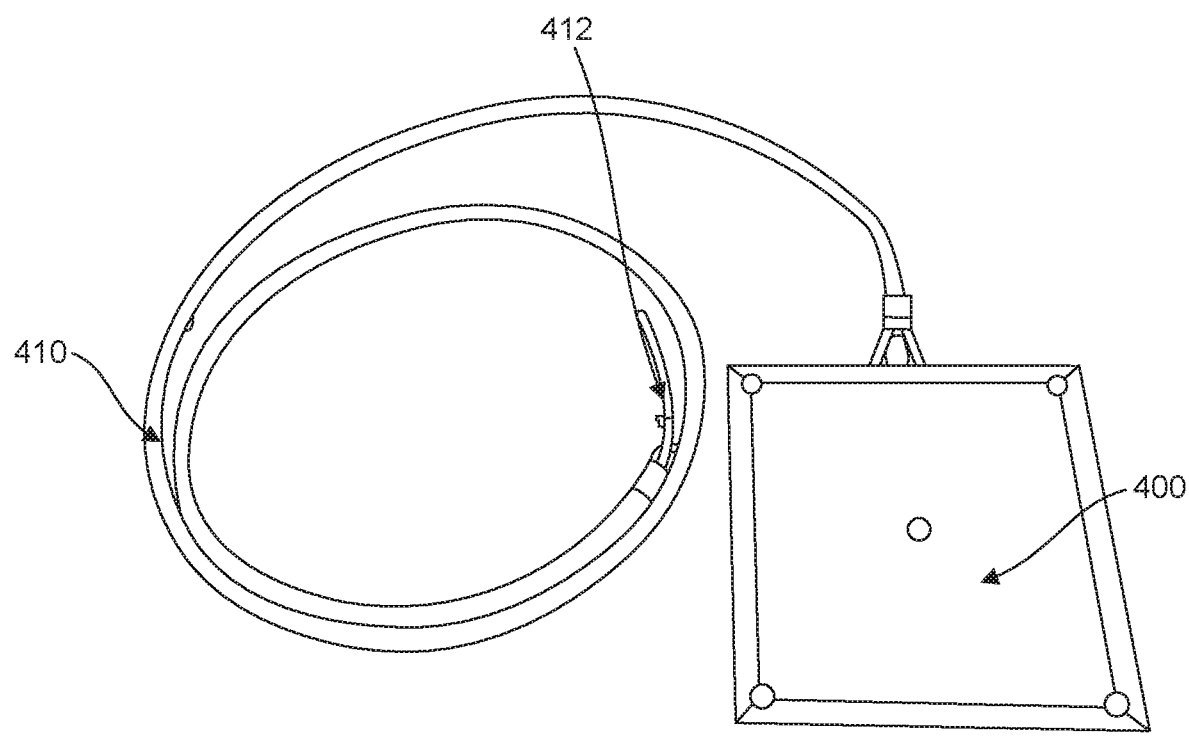
FIG. 4A is an illustration of an example heating element; in accordance with various aspects of the present disclosure.
Figure 4B:
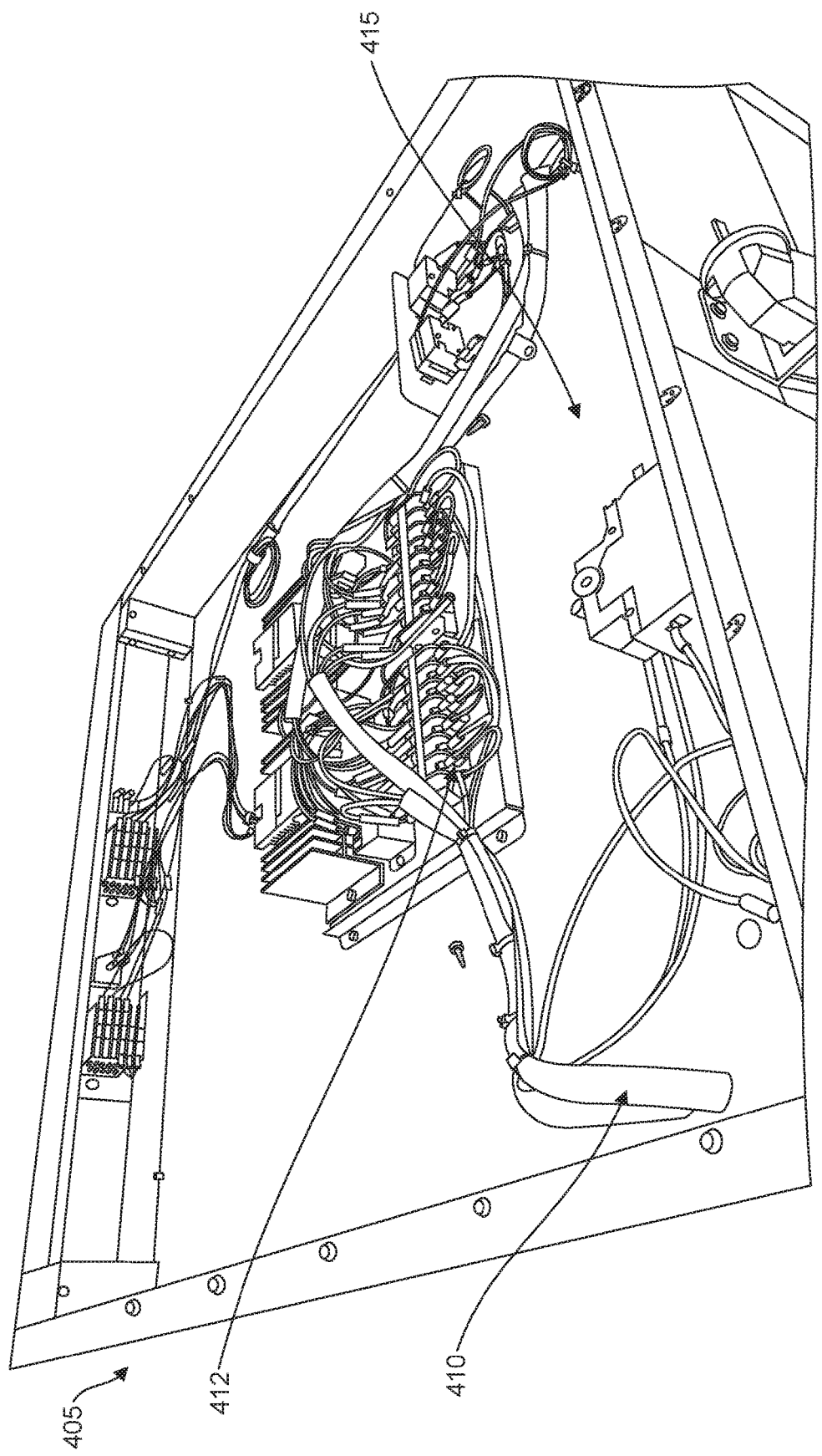
FIG. 4B is an illustration the heating element, shown in FIG. 4A, arranged within the warming cabinet, in accordance with various aspects of the present disclosure.

FIG. 4A is an illustration of an example heating element, in accordance with various aspects of the present disclosure. The heating element 400 has a power cord 410 and a connection end 412. Each heating element 400 is an individual and separate element and can be positioned independently within a warming cabinet. Each heating element 400 can be controlled independently or in combination with other heating elements 400. In some examples, a heating element 400 is a non-convection heating pad or a thermal pad. The connection end 412 may be positioned at the top of the upper surface of the interior of the warming cabinet, as depicted in FIG. 4B. Such a position decreases the likelihood of the short-circuiting of the heating element 400 due to water leaking into the electrical aspects of the heating element 400. In traditional warming cabinets with high-density heating elements, the heating elements are frequently short-circuited and burnt out due to water that has seeped into joints of the electrical connections. This water enters via normal cleaning processes or from the water or water vapor that was added to compensate for the loss of humidity from the use of high-density heat and/or fan. The use of independent heating elements 400 avoids these issues.

FIG. 4B illustrates an example configuration of the extended cable connected points in an example warming cabinet 405. The warming cabinet 405 has multiple heating elements, each with a power cord 410 and a connection end 412. The connection end 412 may be positioned at the top of the upper surface of the interior of the warming cabinet 415. This position conceals the connection end(s) 412 of the heating elements away from any locations containing moisture, such as the housing interior and/or inner side walls of the warming cabinet, decreasing the likelihood of short circuiting. This position also conceals the connection end(s) 412 for security purposes.

A warming cabinet containing heating elements 400 may be easy to service as the heating elements 400 are easily accessible for repair or replacement. Traditional high-density heating elements like thermal cables or coils are extremely difficult to service as the entire warming cart must be disassembled and the entire heating element must be removed and replaced with an entirely new high-density heating element. This costly, time-consuming and laborious process is avoided with the use of the individual heating elements 400.

While FIG. 4A illustrates an example heating element generally having a rectangular shape, other shapes for the heating element 400 can include square, circular, oval, hexagonal, octagonal, or lacking a uniform shape and seemingly randomly shaped. The heating elements 400 can have the size and shape consistent with the size and shape of the surface or sidewall to which they are to be attached.

Figure 5B:
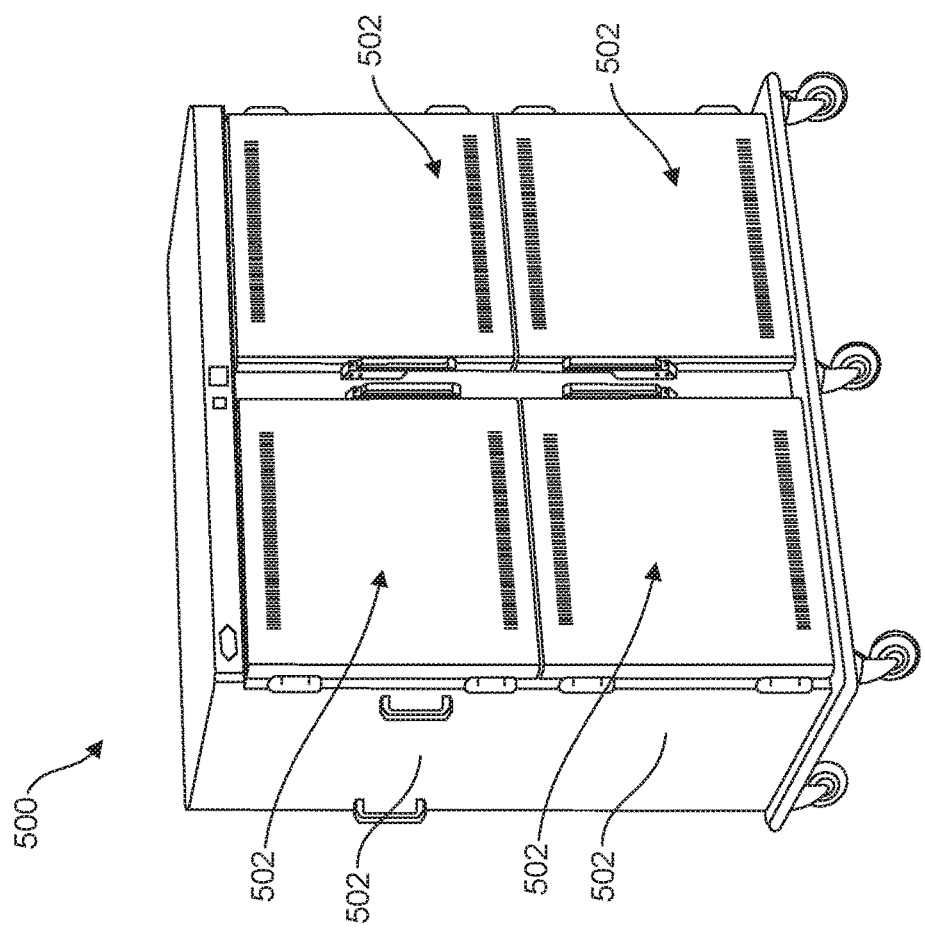
FIGS. 5A-B are illustrations of exteriors of example warming cabinets, in accordance with various aspects of the present disclosure.
Figure 5A:
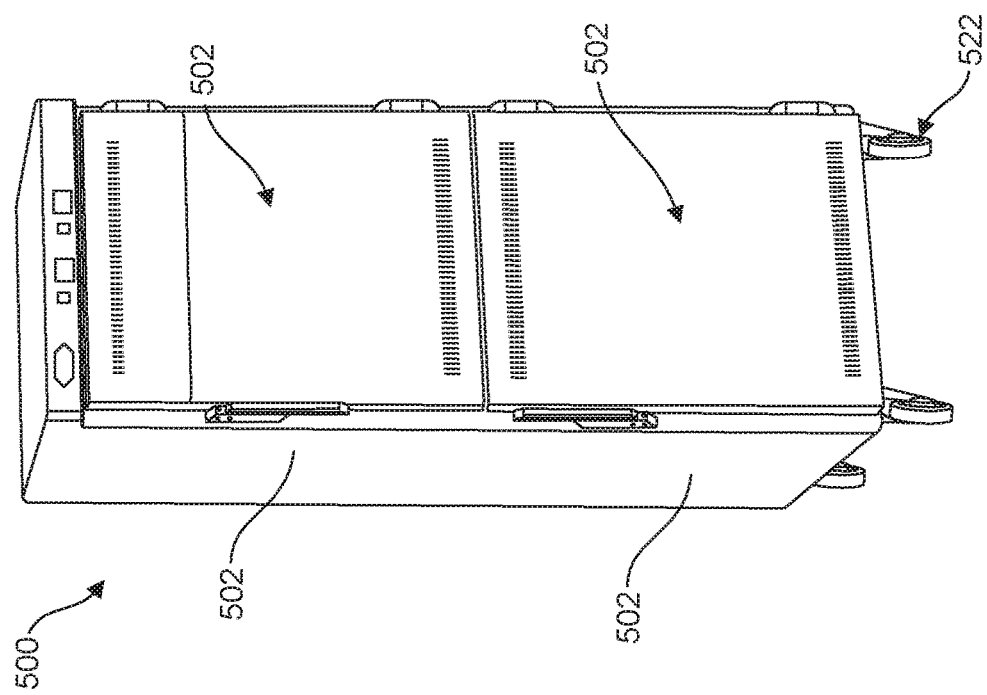

Depending on the size and shape of the warming cabinet, any number of heating elements may be used. For example, two heating elements may be used on opposing sidewalls, as depicted in FIG. 2. In other examples, more than two heating elements may be used on opposing sidewalls, and/or on the upper surface or lower surface. FIGS. 5A-B are illustrations of exteriors of example warming cabinets, in accordance with various aspects of the present disclosure.

FIG. 5A depicts a cabinet with an upper cabinet 510 and a lower cabinet 512. A number of heating elements can be used in the sidewalls of each of the upper cabinet 510 and lower cabinet 512 of FIG. 5A and the two upper cabinets 510 and two lower cabinets 512 of FIG. 5B. The use of these separate heating elements allows for better control of the temperature of the housing interior as temperature variance, for example, between the upper cabinet 510 and the lower cabinet 512. As detailed herein, the temperature variance according to the present disclosure is around 5-6° C.

In some examples, the cabinet may be a cooling cabinet for the storage and/or transport of food requiring lower temperatures. In some aspects, such as depicted in FIG. 5B, the cabinet may be a combination cabinet and have one portion for warming and one portion for cooling. In such examples, the insulation material of the sidewalls and exterior is such that the heating of one cabinet does not adversely affect the cooling of the other.

The warming cabinet 500 has one or more doors 502 which may open to allow for the placement of food within the warming cabinet 500. The warming cabinet 500 may be used to keep food at a safe and even temperature. The warming cabinet 500 may be of any size or shape such that food may be placed inside the warming cabinet 500 for storage and/or transportation.

The warming cabinet 500 includes one or more heating elements configured to radiate heat. The heat provide may be static, constant, even, and gentle throughout an interior of the warming cabinet 500. In addition, and as described in further herein, due to the static, constant, even, and gentle heat, the one or more heating elements maintain a moisture content level within the interior of the warming cabinet 500. In this manner, for example, food arranged within the interior of the warming cabinet 500 may be maintained at a desired moisture level and will not dry out prior to service.

The warming cabinet 500 may be stationary or may have wheels 522 or the like to allow it to be moved for the transport of food.

In some examples, the warming cabinets 500 are insulated with a material such that the heating of one cabinet does not adversely affect the heating or cooling of another. In some aspects, the heating cabinets are insulated with that material such that the heating of one cabinet does not adversely affect the cooling of another. For example, the walls may be insulated with zero ODP injected polyurethane insulation.

Figure 6:
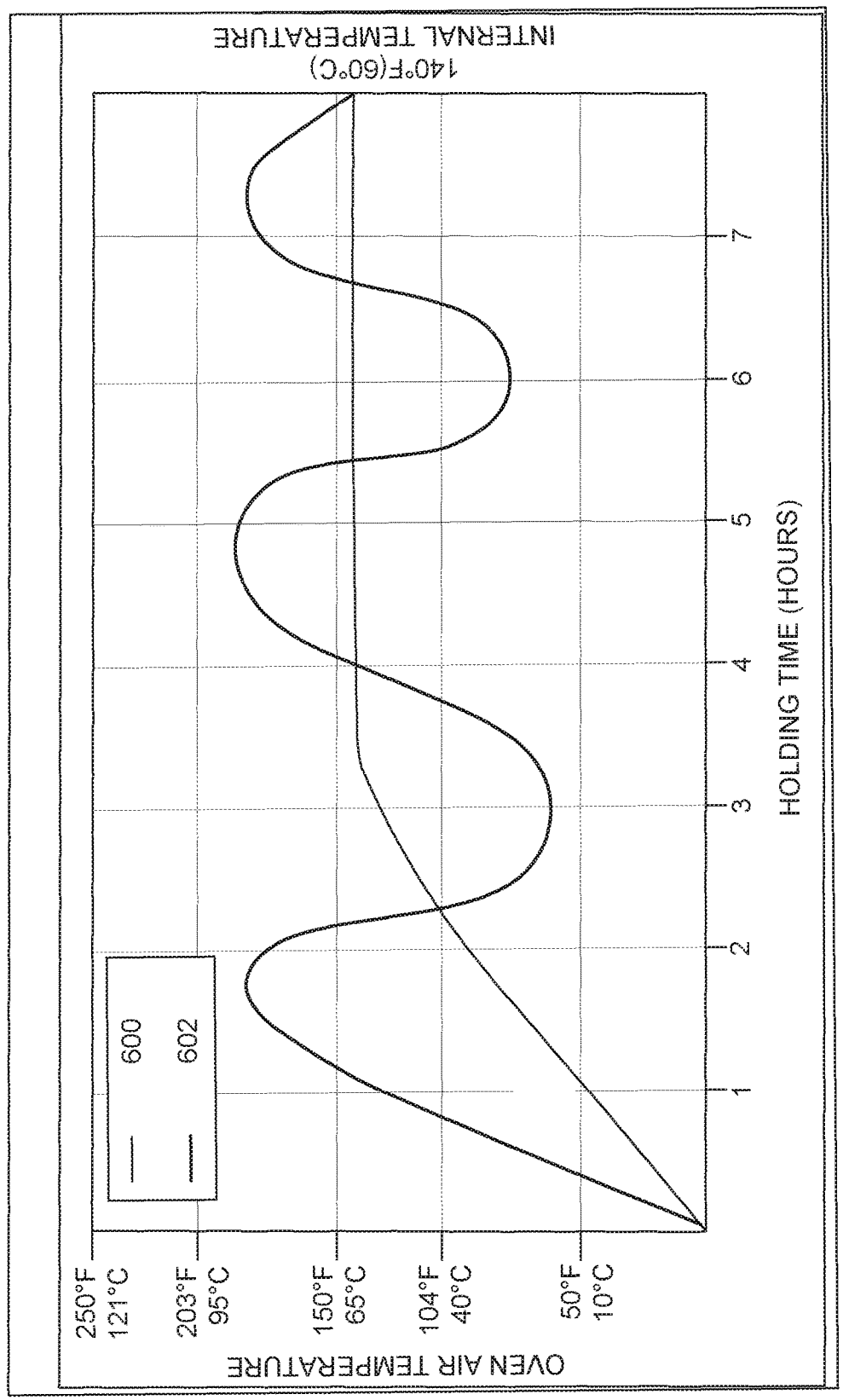
FIG. 6 is an example of a temperature control comparison of warming cabinets, in accordance with various aspects of the present disclosure, and a prior warming cabinet.

FIG. 6 is an example plot of a temperature control of warming cabinets, in accordance with various aspects of the present disclosure, as compared with a traditional warming cabinet containing high-density heating elements.

Graph 600 shows an example temperature pattern of a warming cabinet that is the subject of the present disclosure (as discussed in detail above). The steady oven air temperature over a period of multiple hours results from the radiant, static, constant, even, and gentle heat provided by the thermal pad heating elements of this disclosure. The heating elements maintains a precise temperature and humidity in the warming cabinet chamber, resulting in optimal food after storage in the warming cabinet.

Graph 602 is an example temperature pattern of a warming cabinet using traditional high-density heating elements. As shown in graph 602, maintenance of a desired chamber temperature over a course of many hours using high-density heating elements results in a fluctuating temperature.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A warming cabinet apparatus, the apparatus comprising:
   a housing interior defined by an upper wall defining an upper surface, a lower surface, a first sidewall arranged between the upper surface and the lower surface, and a second side wall arranged between the upper surface and the lower surface, wherein the first sidewall comprises polyurethane insulation and defines a first interior-facing surface, and the second sidewall comprises polyurethane insulation and defines a second interior-facing surface, and wherein the first sidewall and the second sidewall are configured to thermally insulate the housing interior from an exterior surface of the first sidewall and the second sidewall;

a heating pad control on top of the upper wall, wherein the heating pad control includes a finned heat dissipator;

a first heating pad arranged with respect to the first sidewall, a second heating pad arranged with respect to the second side wall, at least a third heating pad arranged with respect to the first sidewall between the first heating pad and the lower surface, at least a fourth heating pad arranged with respect to the second sidewall between the second heating pad and the lower surface, and a fifth heating pad arranged with respect to the lower surface, wherein each of the first, second, at least third, at least fourth and fifth heating pads includes a power cord extending from the heating pad and a connection end on the power cord opposite the heating pad, and wherein the connection end of each of the first, second, at least third, at least fourth and fifth heating pads is connected to the heating pad control on the top of the upper wall;

a first removable sidewall cover covering the interior-facing surface of the first sidewall and the first and at least third heating pads, wherein the first and at least third heating pads are positioned between the first sidewall and the first removable sidewall cover and are accessible from the housing interior upon removal of the first removable sidewall cover;

a second removable sidewall cover covering the interior-facing surface of the second sidewall and the second and at least fourth heating pads, wherein the second and at least fourth heating pads are positioned between the second sidewall and the second removable sidewall cover and are accessible from the housing interior upon removal of the second removable sidewall cover;

wherein the apparatus is free from a heating pad arranged on the upper surface;

wherein the apparatus is free from a fan circulating air within the housing interior; and the first heating pad and the at least third heating pad arranged with respect to the first sidewall are configured to provide different amounts of heat with respect to one another, and the second heating pad and the at least fourth heating pad arranged with respect to the second sidewall are configured to provide different amounts of heat with respect to one another, and wherein the first, second, at least third, at least fourth and fifth heating pads are configured to maintain a temperature within and throughout the housing interior to within 6° C. of a given temperature without fan induced air circulation.

2. The apparatus of claim 1, wherein the first heating pad and the second heating pad are configured to maintain moisture within the housing interior.

3. The apparatus of claim 1, wherein each of the first, second, at least third, at least fourth, and fifth heating pads is substantially rectangular in shape.

* * * * *